(12) United States Patent (10) Patent No.: US 8,332,367 B2
Bhattacherjee et al. (45) Date of Patent: Dec. 11, 2012

(54) PARALLEL DATA REDUNDANCY REMOVAL

(75) Inventors: Souvik Bhattacherjee, New Delhi (IN); Ravi Kothari, New Delhi (IN); Ankur Narang, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 12/908,075

(22) Filed: Oct. 20, 2010

(65) Prior Publication Data

US 2012/0102003 A1 Apr. 26, 2012

(51) Int. Cl.
*G06F 17/30* (2006.01)
(52) U.S. Cl. ............................................ 707/692
(58) Field of Classification Search .............. 707/2, 713, 707/692; 370/392
See application file for complete search history.

(56) References Cited

U.S. PATENT DOCUMENTS

| 7,685,026 | B1 * | 3/2010 | McGrady et al. | 705/28 |
| 7,743,013 | B2 | 6/2010 | Mityagin et al. | |
| 7,849,073 | B2 * | 12/2010 | Young-Lai | 707/713 |
| 2007/0076613 | A1 | 4/2007 | Malhotra et al. | |
| 2007/0115986 | A1 * | 5/2007 | Shankara | 370/392 |
| 2007/0260602 | A1 | 11/2007 | Taylor | |
| 2008/0243800 | A1 | 10/2008 | Beyer et al. | |

OTHER PUBLICATIONS

Donnet et al; Retouched Bloom Filters: Allowing Networked Applications to Trade Off Selected False Positives Against False Negatives, CoNEXT, 2006, 1-12, ACM 159593456, Lisbon, Portugal.
Anad et al; Redundancy in Network Traffic: Findings and Implications, SIGMETRICS/Performance'09, Jun. 15-19, 2009, ACM 978-1-60558-511-Jun. 9, 2006, Seattle, WA, USA.
Yu et al; Hash, Don't Cache: Fast Packet Forwarding for Enterprise Edge Routers, WREN'09, Aug. 21, 2009, ACM 978-1-60558-443-0/09/08, Barcelona, Spain.
Kvasov, Drem: Architectural Support for Deterministic Redundant Execution of Multithreaded Programs, Graduate Department of Electrical and Computer Engineering University of Toronto, 2009, http://cve.mitre.org, 1-59, Toronto, Canada.

* cited by examiner

*Primary Examiner* — Etienne Leroux
(74) *Attorney, Agent, or Firm* — Garg Law Firm, PLLC; Rakesh Garg; Eustus Dwayne Nelson

(57) ABSTRACT

A method, system, and computer usable program product for parallel data redundancy removal are provided in the illustrative embodiments. A plurality of values is computed for a record in a plurality of records stored in a storage device. The plurality of values for the record is distributed to corresponding queues in a plurality of queues, wherein each of the plurality of queues is associated with a corresponding section of a Bloom filter. A determination is made whether each value distributed to the corresponding queues for the record is indicated by a corresponding value in the corresponding section of the Bloom filter. The record is identified as a redundant record in response to a determination that each value distributed to the corresponding queues for the record is indicated by a corresponding value in the corresponding section of the Bloom filter.

20 Claims, 5 Drawing Sheets

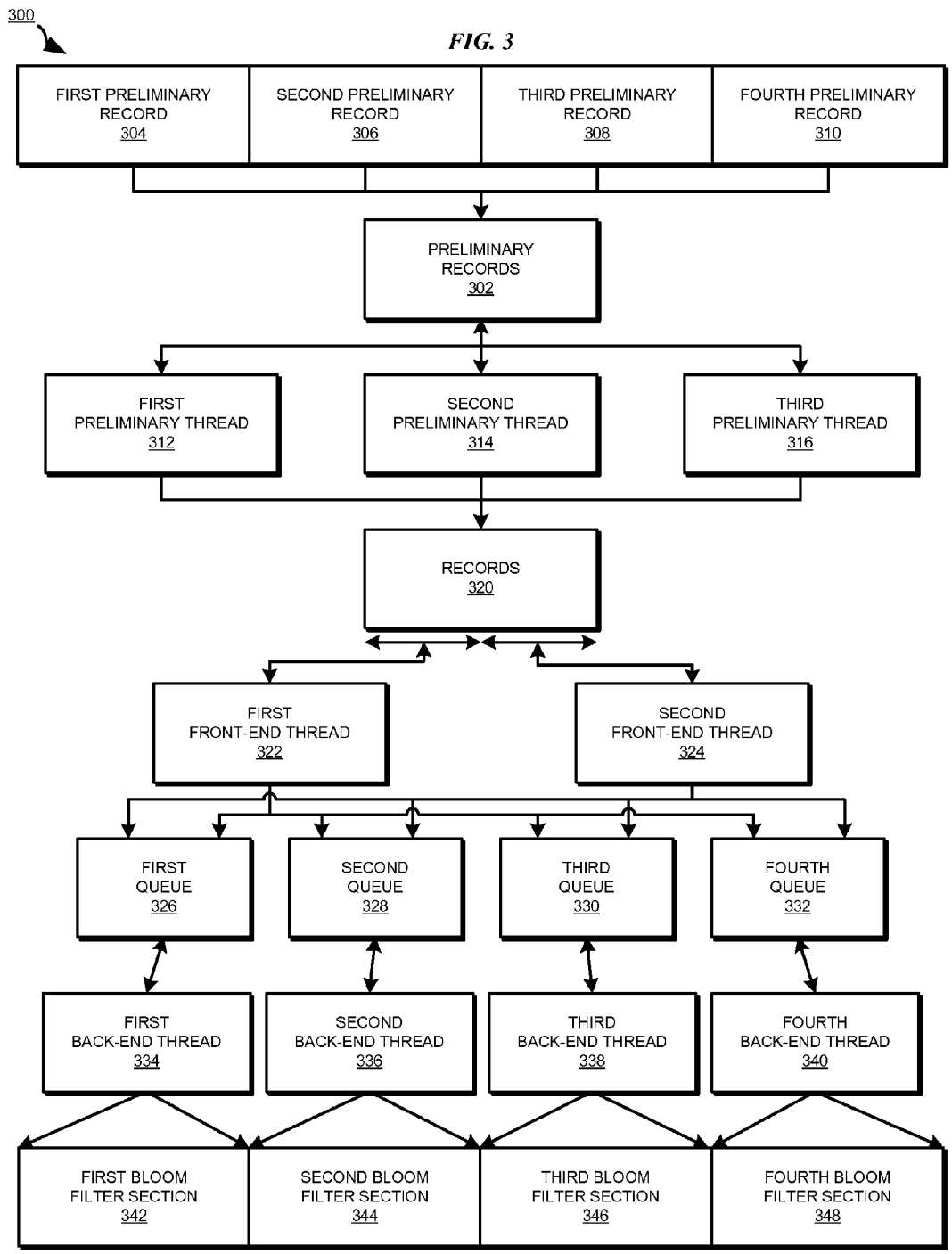

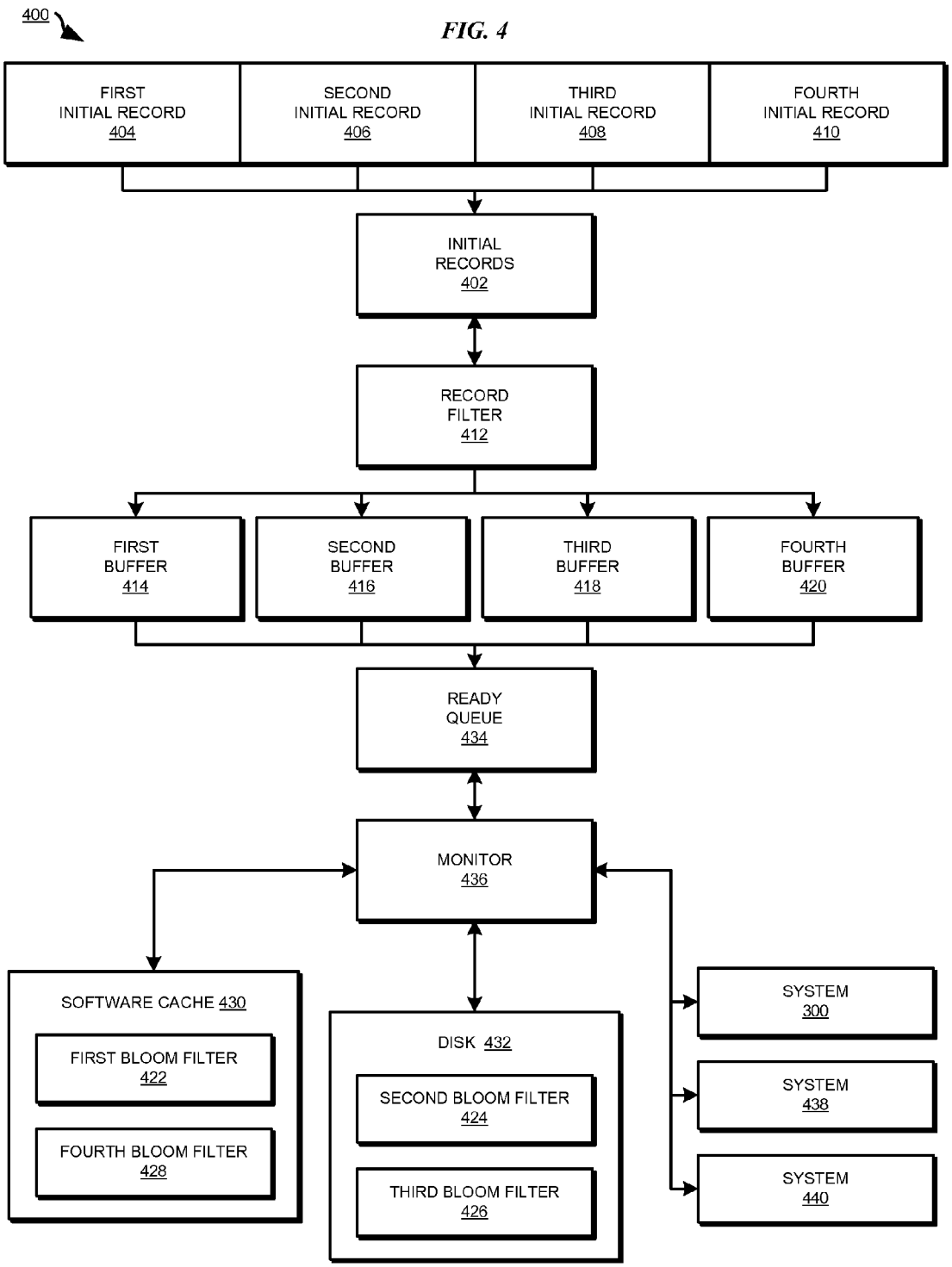

PARALLEL DATA REDUNDANCY REMOVAL

BACKGROUND OF THE INVENTION

1. Field of the Invention

The present invention relates generally to an improved data processing system, and in particular, to a computer implemented method for removing redundant data. More particularly, the present invention relates to a computer implemented method, system, and computer usable program code for parallel data redundancy removal.

2. Description of the Related Art

Diverse application domains, such as telecommunications, online transactions, web pages, stock markets, medical records, and telescope imagery generate significant amounts of data. Removing redundancy in data assists in resource and computing efficiency for the downstream processing of such data. Many application domains aim to remove redundant data records in real-time or near real-time from data flowing at high rates. A data record may be considered redundant for a set of data if another data record exists in the set of data which exactly or approximately matches the data record.

For example, each telephone call in a telecommunication network generates call data records that contain details about the call, such as the calling number and the called number. Errors in call data record generation may produce multiple copies of a call data record. Removing duplicate copies of call data records may assist in resource management prior to storing the call data records. Removing duplicate data records using database accesses may be a slow and inefficient process. Pair-wise string comparisons may make real-time or near real-time redundancy removal prohibitive for large numbers of records.

SUMMARY OF THE INVENTION

The illustrative embodiments provide a method, system, and computer usable program product for parallel data redundancy removal. An embodiment computes several values for a record in a group of records. The embodiment distributes the values for the record to corresponding queues in a set of queues, where each queue is associated with a corresponding section of a Bloom filter. The embodiment determines whether each value distributed to the corresponding queues for the record is indicated by a corresponding value in the corresponding section of the Bloom filter. The embodiment identifies the record as a redundant record in response to a determination that each value distributed to the corresponding queues for the record is indicated by the corresponding value in the corresponding section of the Bloom filter.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 3 depicts a block diagram of an example data processing system in accordance with an illustrative embodiment;

FIG. 4 depicts a block diagram of another example data processing system in accordance with an illustrative embodiment;

DETAILED DESCRIPTION OF THE PREFERRED EMBODIMENT

Figure 1:
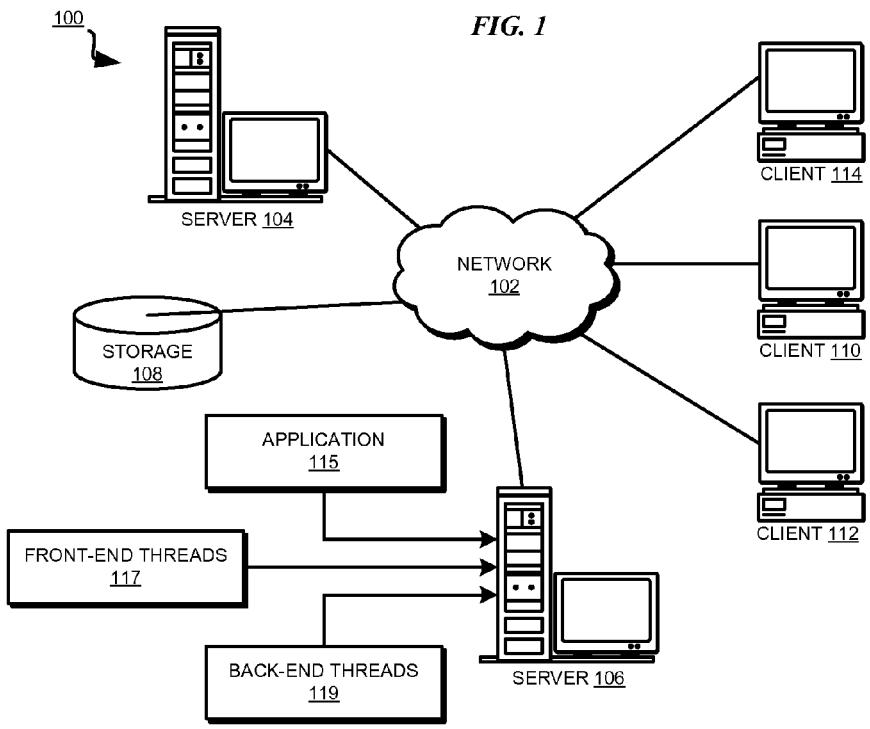
FIG. 1 depicts a pictorial representation of a network of data processing systems in which the illustrative embodiments may be implemented.

A Bloom filter is a space-efficient probabilistic data structure that is used to test whether an element is a member of a set. Bloom filters may be used to remove duplicate data records because Bloom filters enable set membership queries. The Bloom filter efficiency is achieved at the expense of a smaller than threshold false positive rate, where the Bloom filter may falsely report the presence of a record in a data set.

However, a Bloom filter does not typically report false negatives because records which are actually present in the data set are typically recognized as being present. A Bloom filter sets k locations to indicate the presence of a record in a data set, where k is the number of independent hash functions computed for the record. If all of the k locations have already been set, then the record is already present in the data set or a false positive has occurred.

A Bloom filter for billions of records may require tens of Gigabytes, due to the desired threshold rates of false positives, which may prevent loading the Bloom filter into memory. One approach is to load such a Bloom filter on a disk and bring only sections of the Bloom filter into memory for reading and updates. However, randomly accessing different sections of the Bloom filter stored on a disk may lead to significant numbers of disk accesses, which may create a slowdown that causes a reduction in the throughput of data records.

Illustrative embodiments of the invention provide a method, computer usable program product, and data processing system for parallel data redundancy removal. Illustrative embodiments provide threads to process multiple data records simultaneously. A "thread" or "threads" in this disclosure refer to threads, processes, or a combination thereof. The embodiments are described using threads only as examples. Embodiments described with respect to threads may be similarly implemented with processes, or with a combination of threads and processes within the scope of the invention.

According to an embodiment of the invention, multiple front-end threads distribute records to multiple queues based on values computed for each record, where each of the queues corresponds to a different section of a Bloom filter. Multiple back-end queues determine if a Bloom filter section that corresponds to a queue indicates whether any of the records in the queue are redundant records. Rather than randomly accessing sections of a Bloom filter stored in memory, a back-end thread accesses only the section of the Bloom filter that corresponds to the queue that the back-end thread is processing. A sufficient number of back-end queues may enable the section of the corresponding Bloom filter being processed to be small enough to fit into cache, thereby reducing the time required to access memory. Additionally, one back-end thread may request to access a section of a Bloom filter stored in memory while another back-end thread accesses another section of the Bloom filter that is already loaded into cache.

In an embodiment, a record filter may distribute records to buffers based on fields in each record that uniquely group the records in each buffer, where each buffer corresponds to a Bloom filter. Each of the buffers of records may be processed separately along with its corresponding Bloom filter, such that each Bloom filter is accessed separately from the other Bloom filters, thereby reducing memory and disk access contention. In another embodiment, preliminary threads identify and remove redundant records from the buffer provided by a monitor, thereby eliminating more readily identified duplicates prior to the more complex processing of records by the front-end and the back-end threads.

The illustrative embodiments are described with respect to data, data structures, and identifiers only as examples. Such descriptions are not intended to be limiting on the invention. For example, an illustrative embodiment described with respect to a single piece of information may be implemented using a combination of several pieces of information, in a similar manner within the scope of the invention.

Furthermore, the illustrative embodiments may be implemented with respect to any type of data processing system. For example, an illustrative embodiment described with respect to a single-processor standalone data processing system may be implemented in a multiprocessor logical partition system within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to parameterized interface may accept any type of parameter, or a parameterized interface or communication may be replaced by a non-parameterized communication numeric attribute may be implemented using an alphanumeric attribute, a symbolic attribute, or a combination thereof, in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. or Oracle Corporation in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
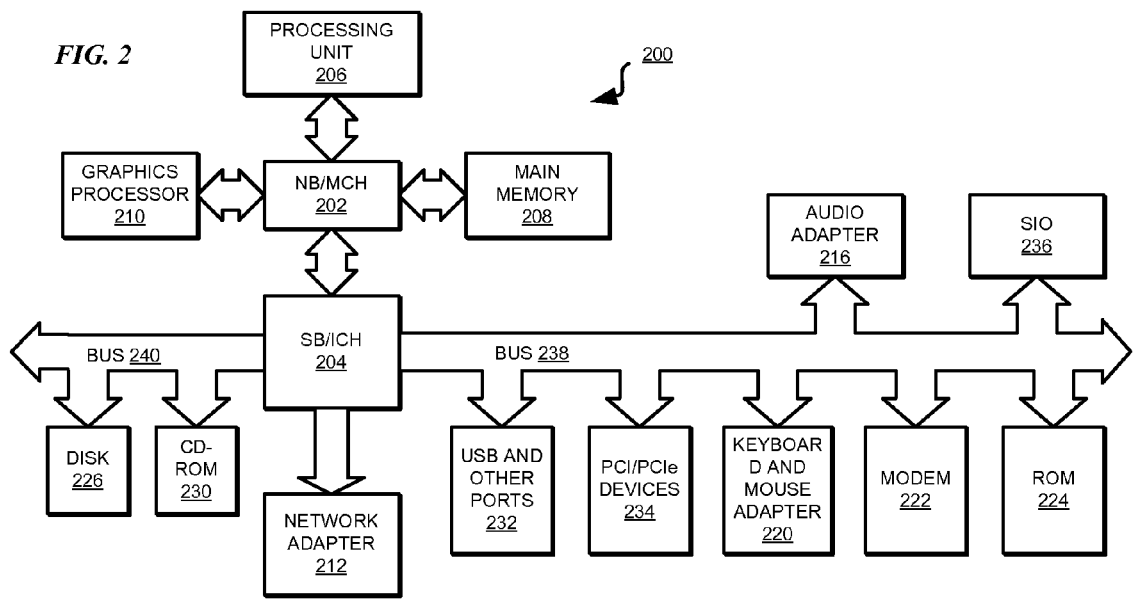
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon. Server 104, server 106, client 110, client 112, and/or client 114 may individually or collectively implement illustrative embodiments for selective memory compression for multi-threaded applications. For example, server 104 includes application 115, front-end threads 117 and back-end threads 119, which enable parallel data redundancy removal, as described below.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc. or Oracle Corporation, in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a block diagram of an example data processing system 300 in accordance with an illustrative embodiment. Data processing system 300 may load only portions of a Bloom filter into cache, thereby enabling faster memory access. First preliminary record 302, second preliminary record 304, third preliminary records 306, fourth preliminary record 308, and any other preliminary records, comprise preliminary records 310. First preliminary thread 312, second preliminary thread 314, and third preliminary thread 316 are threads that may process preliminary records 310 to create records 320. Preliminary threads 312-316 may be units of processing suitable for execution as part of an application.

Data processing system 300 may identify any records of preliminary records 310 that are redundant relative to other records of the preliminary records 310. For example, data processing system 300 identifies second preliminary record 304, which is a record of a telephone call from the United States to India that is a duplicate of first preliminary record 302, which is the same record of the telephone call. For this example, data processing system 300 may subsequently delete second preliminary record 304 from records 310 based on this identification. The rationale for the identification and removal of redundant records by data processing system 300 prior to possible processing by other threads is discussed below.

Data processing system 300 may begin the identification of redundant records of preliminary records 310 by various methods. Data processing system 300 may begin identification of redundant records of preliminary records 310 by assigning a unique identifier to each record of the preliminary records 310. For example, data processing system 300 may use a cryptographic hash function, such as MD5 (Message Digest algorithm 5) or SHA1 (Secure Hash Algorithm 1), to assign a unique identification number to each preliminary record of preliminary records 310. Data processing system 300 may partition preliminary records 310 into parts that provide each of preliminary threads 312-316 with an approximately equal load of preliminary records 310 to process.

Preliminary threads 312-316 may compute a hash value for each record of the preliminary records 310 based on each corresponding unique identifier. For example, first preliminary thread 312 computes a hash value based on the unique identification number for first preliminary record 302 and computes a hash value based on the unique identification number for fourth preliminary record 308.

Preliminary threads 312-316 may store each hash value to a corresponding hash table. For example, first preliminary thread 312 stores the hash value for first preliminary record 302 and the hash value for fourth preliminary record 308 in a hash table associated with first preliminary thread 312.

Data processing system 300 may merge the hash tables associated with preliminary threads 312-316 to identify a redundant record. For example, data processing system 300 merges the hash table associated with first preliminary thread 312, which stores the hash value for first preliminary record 302, with the hash table associated with second preliminary thread 314, which stores the hash value for second preliminary record 304. For this example, data processing system 300 merging the hash tables associated with preliminary threads 312-316 results in identifying the hash value for first preliminary record 302 as identical to the hash value for second preliminary record 304. This identification may indicate that second preliminary record 304 is a duplicate of first preliminary record 302.

Each of preliminary threads 312-316 may remove redundant records from their own hash table. Data processing system 300 may also remove redundant records during a merge of hash tables. For example, data processing system 300 removes second preliminary record 304 from preliminary records 310 to create records 320. Therefore, records 320 consist of only unique records with respect to themselves. Preliminary threads 312-316 identify and remove redundant records from preliminary records 310, thereby eliminating more readily identified duplicates prior to the more complex processing of records by other threads.

First front-end thread 322 and second front-end thread 324 are threads that distribute values for records 320 to first queue 326, second queue 328, third queue 330, and fourth queue 332. Front-end threads 322-324 are units of processing suitable for execution as part of an application and are similar to front-end threads 117 in FIG. 1.

Front-end threads 322-324 compute multiple values for each record of records 320. For example, first front-end thread 322 computes k hash values for each record of the first half of records 320 based on the unique identification number for each record, while second front-end thread 322 computes k hash values for each record of the second half of records 320 based on the unique identification number for each record.

If front-end threads 322-324 compute multiple values for approximate matching, instead of exact matching, for each record of records 320, front-end threads 322-324 may use locality sensitive hash functions to compute multiple values for each record. Locality sensitive hash functions may process records as points in space, and may assign the corresponding points in space into groups based on some distance metric operating on the points. Points that are close to each other under the chosen metric may be assigned to the same group with high probability.

Front-end threads 322-324 distribute the multiple values for each record to corresponding queues of queues 326-332. For example, first front-end thread 322 distributes the two hash values for first preliminary record 302 to first queue 326 and fourth queue 332. The values for each record correspond to locations in a Bloom filter, and each of queues 326-332 is associated with a corresponding section of the Bloom filter.

If front-end threads 322-324 compute multiple values for approximate matching, instead of exact matching, for each record of records 320, front-end threads 322-324 may distribute the records, processed as points in space, to buffers based on some distance metric operating on the points. Records whose points that are close to each other under the chosen metric may be distributed to the same buffer with high probability.

Preliminary threads 312-316 perform local de-duplication operations of preliminary records 310 due to the following potential functioning of front-end threads 322-324. The data record set {a, b, d, b, f, h} contains a fourth record that is a duplicate of the second record. For this example, first front-end thread 322 computes k hash values for each record of {a, b, d}, while second front-end thread 324 computes k hash values for each record of {b, f, h}. If the order of k accesses by front-end threads 322-324 to queues 326-332 is interleaved, front-end threads 322-324 may not be able to determine that the fourth record is a duplicate of the second record. Failing to detect such a duplicate may lead to the undesirable outcome of false negative results.

Furthermore, if second front-end thread 324 completes computation for the fourth record before first front-end thread 322 completes computation for the second record, then first front-end thread 322 may report the second record as the duplicate of the later-occurring fourth record. Some application domains require that all but the first occurrence of a record need to be identified as duplicates and discarded. Therefore, preliminary threads 312-316 perform local de-duplication operations of preliminary records 310 to address these potential issues.

First back-end thread 334, second back-end thread 336, third back-end thread 338, and fourth back-end thread 340 are threads that access values in first queue 326, second queue 328, third queue 330, fourth queue 332, and corresponding locations in first Bloom filter section 342, second Bloom filter section 344, third Bloom filter section 346, and fourth Bloom filter section 348. Each of back-end threads 334-340 is assigned to an approximately equal-sized section of the Bloom filter to enable simultaneous access by back-end threads 334-340 to Bloom filter sections 342-348. Each of back-end threads 334-340 is also assigned to one of the queues 326-332 that corresponds to the section of the Bloom filter assigned to the back-end thread. Back-end threads 334-340 are units of processing suitable for execution as part of an application and are similar to back-end threads 119 in FIG. 1.

Back-end threads 334-340 determine whether each value distributed to the corresponding queues for a record of records 320 is indicated by a corresponding value in the corresponding section of a Bloom filter. For example, first back-end thread 334 determines whether the hash value stored for first preliminary record 302 to first queue 326 is indicated by the corresponding value in the corresponding first Bloom filter section 342.

Back-end threads 334-340 identify a record as a redundant record if each value distributed to the corresponding queues for the record is indicated by a corresponding value in the corresponding section of a Bloom filter. For example, back-end threads 334-340 identify third preliminary record 306 as a redundant record because the hash value for the third preliminary record 306 that is distributed to second queue 328 is indicated by a corresponding bit in second Bloom filter section 344 and the hash value for third preliminary record 306 that is distributed to third queue 330 is indicated by a corresponding bit in third Bloom filter section 346.

Rather than randomly accessing sections of a Bloom filter stored in memory, back-end thread 334 accesses only first Bloom filter section 342 that corresponds to first queue 326 that back-end thread 334 is processing. First Bloom filter section 342 may be small enough to fit into cache, thereby reducing the time required to access memory. Additionally, back-end thread 334 may request to access first Bloom filter section 342 stored in memory while back-end thread 340 accesses fourth Bloom filter section 348 that is already loaded into cache.

If back-end threads 334-340 are identifying whether a record is a redundant record based on approximate matching, instead of exact matching, back-end threads 334-340 may identify if each value, processed as a point in space, distributed to the corresponding queues for the record is within a specified distance metric of a corresponding value, processed as a point in space, in the corresponding section of the Bloom filter. Records whose points are close to each other under the chosen metric may be associated with the same section of the Bloom filter with high probability.

Back-end threads 334-340 determine whether a redundant record duplicates one of the records in a repository associated with a Bloom filter. For example, back-end threads 334-340 determine whether third preliminary record 306 duplicates one of the records in the repository for the Bloom filter or whether the Bloom filter sections 344-346 have returned a false positive result.

Back-end threads 334-340 identify a record from records 320 as a redundant record in response to a determination that the redundant record duplicates one of the records in a repository. For example, back-end threads 334-340 remove third preliminary record 306 from records 320 because third preliminary record 306 duplicates one of the records in a repository.

Back-end threads 334-340 identify a record as a unique record if each value distributed to the corresponding queues for the record of records 320 is not indicated by the corresponding value in the corresponding section of a Bloom filter. For example, back-end threads 334-340 identify second preliminary record 304 as a unique record because the hash value for second preliminary record 304 that is distributed to fourth queue 332 is not indicated by a corresponding bit in fourth Bloom filter section 348.

Back-end threads 334-340 store a unique record in a repository associated with a Bloom filter. For example, back-end threads 334-340 store second preliminary record 304 in a repository as a unique record.

Back-end threads 334-340 store the unique record in the repository by setting an indicator in the corresponding value in the corresponding section of a Bloom filter for each value distributed to the corresponding queues for the unique record. For example, back-end threads 334-340 set a bit in fourth Bloom filter section 348 that corresponds to the hash value for second preliminary record 304 that is distributed to the fourth queue 332 and set a bit in first Bloom filter section 342 that corresponds to the hash value for second preliminary record 304 that is distributed to the first queue 326.

The examples of elements 302-348 are not intended to be limiting on the invention. Many other elements and combinations of elements 302-348 will be apparent to those of ordinary skill in the art and the same are contemplated within the scope of the invention.

With reference to FIG. 4, this figure depicts a block diagram of another example data processing system 400 in accordance with an illustrative embodiment. Data processing system 400 may subdivide records into buffers that correspond to Bloom filters stored on disk, such that only one Bloom filter may need to be accessed for an extended period of time. Furthermore, data processing system 300 in FIG. 3 may load only portions of the Bloom filter stored in memory into cache, thereby enabling faster memory access. First initial record 402, second initial record 404, third initial records 406, fourth initial record 408, and any other initial records comprise initial records 410.

Each record of initial records 410 may be considered as a data pattern, such as a bit pattern, a byte pattern, or a word pattern, with each data pattern associated with a corresponding buffer. Each record may have the same format and consist of well-defined fields. The value of some specific fields for each record may comprise a definite range of values, such that a unique range is associated with each buffer. Each buffer may be assigned only records whose specific fields have a value that lies within the range represented by the buffer. Using such a buffer assignment for records, two records in different buffers can never be the same. Therefore, de-duplication may be performed for each buffer independently, and each buffer may correspond to a logically separate Bloom filter. The size of the Bloom filter for each buffer will depend on the number of records assigned to each buffer and on the false positive rate desired.

Record filter 412 computes a value for each record of initial records 410 based on fields associated with each record. For example, record filter 412 assigns the value "0" to fourth initial record 408 because the first two bits of fourth initial record 408 are "00," assigns the value "1" to third initial record 406 because the first two bits of third initial record 406 are "01," assigns the value "2" to second initial record 404 because the first two bits of second initial record 404 are "10," and assigns the value "3" to first initial record 402 because the first two bits of first initial record 402 are "11."

Record filter 412 distributes each record to a corresponding buffer of buffers 414-420 based on the assigned value for each record. For example, record filter 412 distributes fourth initial record 408 to first buffer 414 because the assigned value of fourth initial record 408 is "0," distributes third initial record 406 to second buffer 416 because the assigned value of third initial record 406 is "1," distributes second initial record 404 to third buffer 418 because the assigned value of second initial record 404 is "2," and distributes first initial record 402 to fourth buffer 420 because the assigned value of first initial record 402 is "3."

Data processing system 400 may use pairs of buffers for each of buffers 414-420, such that when the first of the buffer pair for third buffer 418 is filled with records and ready to be processed, the second of the buffer pair for third buffer 418 may still continue to receive records.

Each of buffers 414-420 is associated with a corresponding Bloom filter. For example, first buffer 414 corresponds to first Bloom filter 422, second buffer 416 corresponds to second Bloom filter 424, third buffer 418 corresponds to third Bloom filter 426, and fourth buffer 420 corresponds to fourth Bloom filter 428. Any combination of Bloom filters 422-428 may be stored in software cache 430 and/or on disk 432.

When any of buffers 414-420 is filled with distributed records, a reference to the filled record buffer is assigned to ready queue 434. For example, record filter 412 assigns a reference to second buffer 416 to ready queue 434 because second buffer 416 is filled with distributed records.

Monitor 436 scans ready queue 434 for references to filled buffers. Monitor 436 also scans system 300, system 438, and system 440 for availability, wherein systems 438-440 are substantially similar to system 300 in FIG. 3 for in-memory removal of redundant data. If a system is available to remove redundant data from a filled buffer, monitor 436 assigns records of a buffer of buffers 414-420 to system 300, system 438, or system 440 as their preliminary records. For example, monitor 436 assigns records of second buffer 416 to preliminary threads 312-316 in FIG. 3 of system 300 in FIG. 3 as preliminary records 310 in FIG. 3.

Monitor 436 assigns a Bloom filter corresponding to a buffer to system 438, system 440, or system 300 in FIG. 3 as their Bloom filter. For example, monitor 436 assigns second Bloom filter 424, which corresponds to second buffer 416, to back-end threads 334-340 in FIG. 3 of system 300 in FIG. 3 as the Bloom filter that will be accessed in sections. As an example, Bloom filters 422-428 may initially reside on disk 432, such that a Bloom filter assigned to system 300, system 438, or system 440 is loaded into memory before being used to remove redundant data.

Software cache 430 enables optimization of system 400. When monitor 436 prepares to assign a filled buffer to a system for removing redundant data, monitor 436 determines whether the Bloom filter that corresponds to the filled buffer is loaded in software cache 430. If the Bloom filter that corresponds to the filled buffer is not loaded in software cache 430, monitor 436 pre-fetches the Bloom filter that corresponds to the filled buffer and loads the corresponding Bloom filter to software cache 430. Monitor 436 pre-fetches by loading a Bloom filter that may be used in the near future into software cache 430 so that the Bloom filter may be accessed more quickly than if the Bloom filter was on disk 432. When monitor 436 subsequently determines that at least one of the systems 300, 438, or 440 for removing redundant data is available, monitor 436 assigns the filled buffer and the corresponding Bloom filter stored in software cache 430 to the available system.

In order to pre-fetch a Bloom filter into software cache 430, monitor 436 may first need to evict a Bloom filter previously stored in software cache 430 and write the previously stored Bloom filter to disk 432. Monitor 436 may first need to evict a Bloom filter previously stored in software cache 430 because software cache 430 may have a limited capacity to load only a limited number of Bloom filters. Monitor 436 may evict the Bloom filter in software cache 430 with the least expected usage in the future. Monitor 436 may determine which buffers will be assigned to systems for removing redundant data in the near future based on the references in ready queue 434 and each buffer's utilization level. A Bloom filter in software cache 430 that does not correspond to a reference in ready queue 434 or a buffer with a high utilization level is a candidate for eviction from software cache 430.

Record filter 412 may distribute initial records 410 to buffers 414-420 based on fields in each record that uniquely group the records in each buffer, where each buffer corresponds to a Bloom filter. Each of buffers 414-420 may be processed separately along with its corresponding Bloom filter, such that each Bloom filter is accessed separately from the other Bloom filters, thereby reducing memory and disk access contention.

The examples of elements 402-440 are not intended to be limiting on the invention. Many other elements and combinations of elements 402-440 will be apparent to those of ordinary skill in the art and the same are contemplated within the scope of the invention.

Figure 5A:
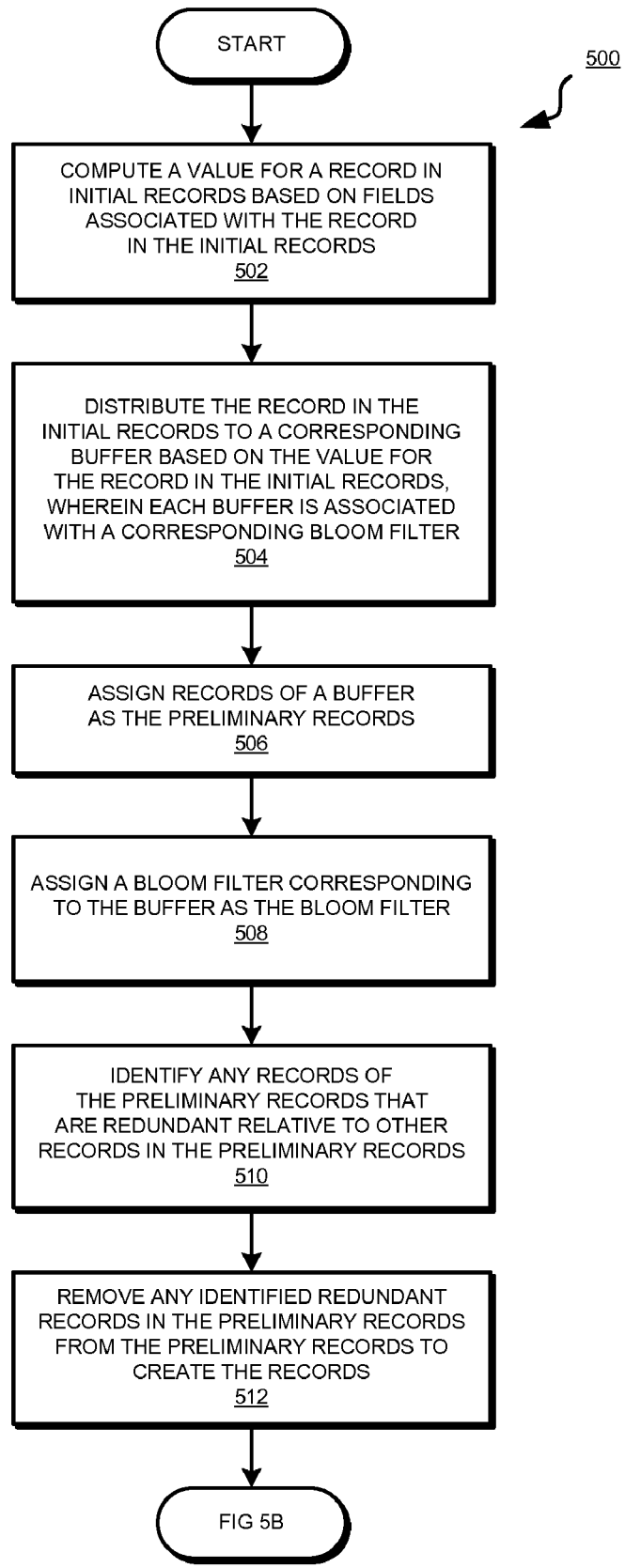
FIG. 5A depicts a flowchart of an example optional process for parallel data redundancy removal in accordance with an illustrative embodiment.

With reference to FIG. 5A, this figure depicts a flowchart of an example optional process 500 for parallel data redundancy removal in accordance with an illustrative embodiment. Process 500 may be implemented, for example, in application 115 in FIG. 1.

Process 500 begins by optionally computing a value for each record in initial records 410 in FIG. 4 based on fields associated with each record in initial records 410 (step 502). For example, record filter 412 assigns the value "2" to second initial record 404 because the first two bits in second initial record 404 are "10" in FIG. 4.

Process 500 may optionally distribute each record in initial records 410 in FIG. 4 to a corresponding buffer based on the value for each record in initial records 410, wherein each buffer is associated with a corresponding Bloom filter (step 504). For example, record filter 412 distributes second initial record 404 to third buffer 418 because the assigned value of second initial record 404 is "2" in FIG. 4.

Process 500 may optionally assign records in a buffer as preliminary records 310 in FIG. 3 (step 506). For example, monitor 436 in FIG. 4 assigns records in second buffer 416 in FIG. 4 to preliminary threads 312-316 of system 300 in FIG. 3 as preliminary records 310 in FIG. 3.

Process 500 may optionally assign a Bloom filter corresponding to a buffer as the Bloom filter (step 508). For example, monitor 436 in FIG. 4 assigns second Bloom filter 426 in FIG. 4, which corresponds to second buffer 416 in FIG. 4, to back-end threads 334-340 of system 300 in FIG. 3 as the Bloom filter that will be accessed in sections.

Process 500 may optionally identify any records in preliminary records 310 in FIG. 3 that are redundant relative to other records in preliminary records 310 (step 510). For example, first preliminary thread 312 and second preliminary thread 314 identify second preliminary record 304 as a duplicate of first preliminary record 302 in FIG. 3.

Process 500 may optionally remove any identified redundant records in preliminary records 310 in FIG. 3 from preliminary records 310 to create records 320 in FIG. 3 (step 512). For example, data processing system 300 removes second preliminary record 304 from preliminary records 310 to create records 320 in FIG. 3. Process 500 continues on FIG. 5B.

Figure 5B:
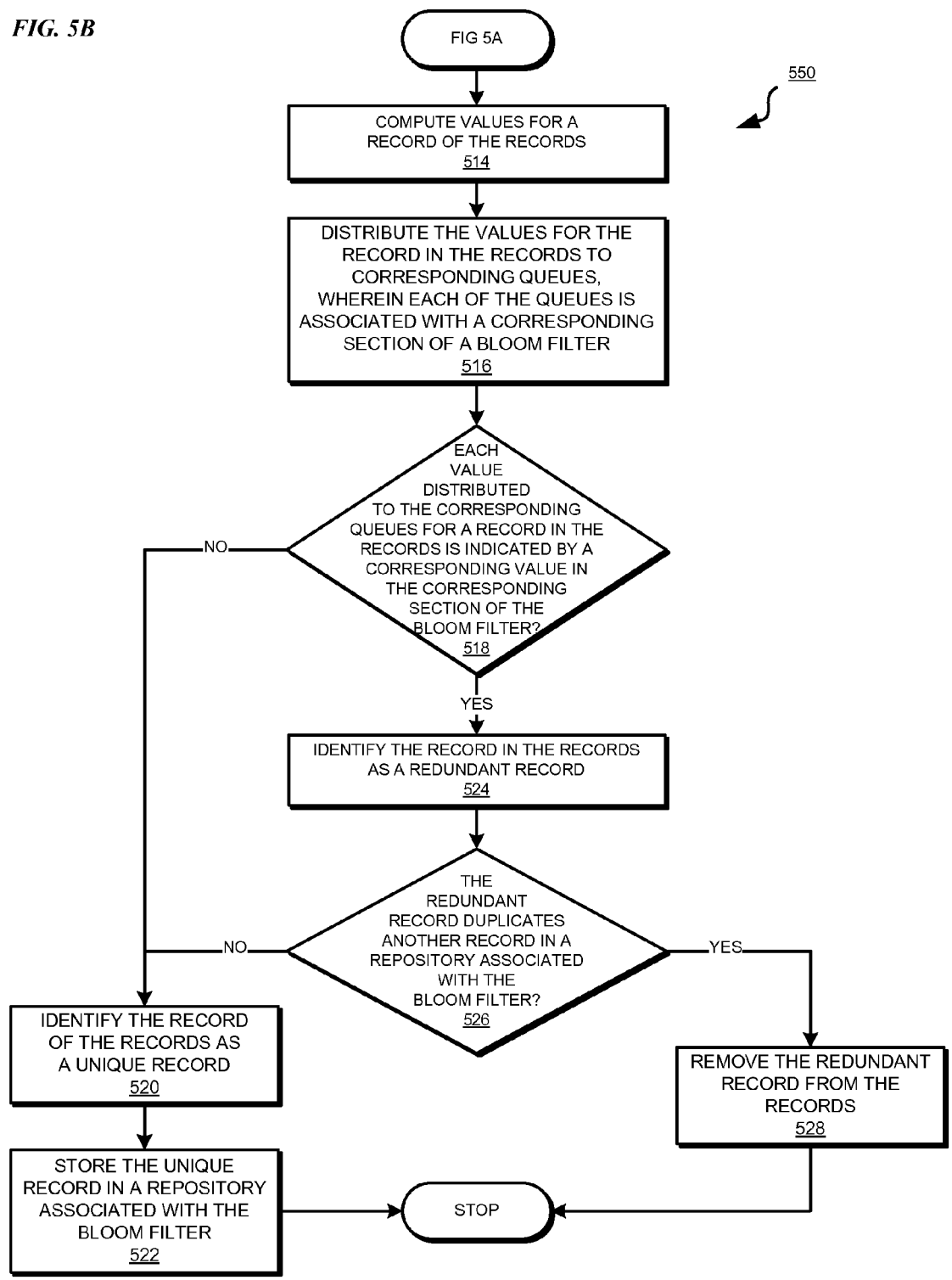
FIG. 5B depicts a flowchart of another example process for parallel data redundancy removal in accordance with an illustrative embodiment.

With reference to FIG. 5B, this figure depicts a flowchart of an example process 550 for parallel data redundancy removal in accordance with an illustrative embodiment. Process 550 computes values for each record in records 320 in FIG. 3 (step 514). For example, first front-end thread 322 computes k hash values for each record in the first half of records 320 based on the unique identification number for each record in FIG. 3.

Process 550 distributes the values for each record in records 320 in FIG. 3 to corresponding queues, wherein each of the queues is associated with a corresponding section of a Bloom filter (step 516). For example, first front-end thread 322 distributes the two hash values for first preliminary record 302 to first queue 326 and fourth queue 332 in FIG. 3.

If process 550 determines that each value distributed to the corresponding queues for a record in records 320 in FIG. 3 is not indicated by a corresponding value in the corresponding section of a Bloom filter ("No" path of step 518), process 550 identifies the record in records 320 as a unique record (step 520) and stores the unique record in a repository associated with the Bloom filter (step 522). For example, back-end threads 334-340 identify second preliminary record 304 as a unique record because the hash value for second preliminary record 304 that is distributed to the fourth queue 332 is not indicated by a corresponding bit in the fourth Bloom filter section 348, and stores second preliminary record 304 in a repository as a unique record in FIG. 3.

If process 550 determines that each value distributed to the corresponding queues for a record in records 320 in FIG. 3 is indicated by a corresponding value in the corresponding section of a Bloom filter ("Yes" path of step 518), process 550 identifies the record in records 320 as a redundant record (step 524) and determines whether the redundant record duplicates one of the records in a repository associated with the Bloom filter (step 526). For example, back-end threads 334-340 identify third preliminary record 306 as a redundant record because the hash value for third preliminary record 306 that is distributed to second queue 328 is indicated by a corresponding bit in second Bloom filter section 344 and the hash value for third preliminary record 306 that is distributed to third queue 330 is indicated by a corresponding bit in third Bloom filter section 346 in FIG. 3.

If process 550 determines that the redundant record duplicates another record in a repository associated with the Bloom filter ("Yes" path of step 526), process 550 removes the redundant record from records 320 in FIG. 3 (step 528) and process 550 ends thereafter. For example, back-end threads 334-340 remove third preliminary record 306 from records 320 because third preliminary record 306 duplicates another record in the repository in FIG. 3.

If process 550 determines that the redundant record does not duplicate another record in a repository associated with a Bloom filter ("No" path of step 526), process 550 identifies the record in records 320 in FIG. 3 as a unique record (step 520) and stores the unique record in a repository associated with the Bloom filter (step 522). For example, back-end threads 334-340 identify second preliminary record 304 as a unique record because the hash value for second preliminary record 304 that is distributed to fourth queue 332 is not indicated by a corresponding bit in fourth Bloom filter section 348 and stores second preliminary record 304 in a repository as a unique record in FIG. 3.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for parallel data redundancy removal. Illustrative embodiments of the invention access only the section of the Bloom filter that corresponds to a queue that is being processing, rather than randomly accessing sections of the Bloom filter stored in memory. A sufficient number of back-end queues may enable the section of the corresponding Bloom filter being processed to be small enough to fit into cache, thereby reducing the time required to access memory. Additionally, one back-end thread may request to access a section of a Bloom filter stored in memory while another back-end thread accesses another section of the Bloom filter that is already loaded into cache.

In another embodiment, uniquely grouped buffers of records may be processed separately along with its corresponding Bloom filter, such that each Bloom filter is accessed separately from the other Bloom filters, thereby reducing memory and disk access contention. In yet another embodiment, preliminary threads identify and remove redundant records from the buffer provided by the monitor, thereby eliminating more readily identified duplicates prior to the more complex processing of records by the front-end and the back-end threads.

Although the embodiments are described using examples of data processing systems and devices or components of data processing systems, such examples are not limiting on the invention. An embodiment may be implemented in any device capable of storing data, and in any system where such device may be used within the scope of the invention. Some examples of other types of devices within the scope of the invention may be controller modules, sensors, and other electromechanical components. Such devices may be usable in conjunction with automobiles, engineering equipment, machinery, or tools within the scope of the invention.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for parallel data redundancy removal, the computer implemented method comprising:
   computing a plurality of values for a record in a plurality of records stored in a storage device;
   distributing the plurality of values for the record to corresponding queues in a plurality of queues, wherein each of the plurality of queues is associated with a corresponding section of a Bloom filter;
   determining whether each value distributed to the corresponding queues for the record is indicated by a corresponding value in the corresponding section of the Bloom filter; and
   identifying the record as a redundant record in response to a determination that each value distributed to the corresponding queues for the record is indicated by a corresponding value in the corresponding section of the Bloom filter.

2. The computer implemented method of claim 1, wherein the computing the plurality of values is performed in parallel by threads for multiple records in the plurality of records, and the distributing the plurality of values is performed in parallel by the threads for the multiple records to corresponding queues in the plurality of queues.

3. The computer implemented method of claim 1, further comprising:
   determining whether the redundant record duplicates another record in a repository associated with the Bloom filter; and
   removing the redundant record from the plurality of records in response to a determination that the redundant record duplicates another record in the repository.

4. The computer implemented method of claim 1, further comprising:
   identifying the record as a unique record in response to a determination that each value distributed to the corresponding queues for the record is not indicated by the corresponding value in the corresponding section of the Bloom filter; and
   storing the unique record in a repository associated with the Bloom filter.

5. The computer implemented method of claim 4, wherein storing the unique record in the repository comprises setting an indicator in the corresponding value in the corresponding section of the Bloom filter for each value distributed to the corresponding queues for the unique record.

6. The computer implemented method of claim 1, further comprising:
   identifying any records in a preliminary plurality of records that are redundant relative to other records in the preliminary plurality of records;
   removing any identified redundant records of the preliminary plurality of records from the preliminary plurality of records to create the plurality of records.

7. The computer implemented method of claim 6, wherein identifying any records in the preliminary plurality of records that are redundant relative to other records in the preliminary plurality of records comprises:
   assigning a unique identifier to a record in the preliminary plurality of records;
   computing a hash value for the record in the preliminary plurality of records based on the corresponding unique identifier;
   storing the hash value to a corresponding hash table in a plurality of hash tables; and
   merging the plurality of hash tables to identify at least one record of multiple records that correspond to values that are identical for the at least one record in different hash tables as redundant relative to other records in the preliminary plurality of records.

8. The computer implemented method of claim 6, further comprising:

computing a value for a record in an initial plurality of records based on a plurality of fields associated with each record in the initial plurality of records;

distributing the record in the initial plurality of records to a corresponding buffer in a plurality of buffers based on the value for the record in the initial plurality of records, wherein each of the plurality of buffers is associated with a corresponding Bloom filter;

assigning records of a buffer in the plurality of buffers as the preliminary plurality of records;

pre-fetching a second Bloom filter corresponding to the buffer to cache; and assigning the second Bloom filter corresponding to the buffer as the Bloom filter.

9. A computer usable program product comprising a computer usable storage medium including computer usable code for parallel data redundancy removal, the computer usable code comprising:

computer usable code for computing a plurality of values for a record in a plurality of records stored in a storage device;

computer usable code for distributing the plurality of values for the record to corresponding queues in a plurality of queues, wherein each of the plurality of queues is associated with a corresponding section of a Bloom filter;

computer usable code for determining whether each value distributed to the corresponding queues for the record is indicated by a corresponding value in the corresponding section of the Bloom filter; and computer usable code for identifying the record as a redundant record in response to a determination that each value distributed to the corresponding queues for the record is indicated by the corresponding value in the corresponding section of the Bloom filter.

10. The computer usable program product of claim 9, wherein the computing the plurality of values is performed in parallel by threads for multiple records in the plurality of records by threads, and the distributing the plurality of values is performed in parallel by the threads for the multiple records to corresponding queues in the plurality of queues by the threads.

11. The computer usable program product of claim 9, further comprising:

computer usable code for determining whether the redundant record duplicates one of the records in a repository associated with the Bloom filter; and computer usable code for removing the redundant record from the plurality of records in response to a determination that the redundant record duplicates another record in the repository.

12. The computer usable program product of claim 9, further comprising:

computer usable code for identifying the record as a unique record in response to a determination that each value distributed to the corresponding queues for the record is not indicated by the corresponding value in the corresponding section of the Bloom filter; and computer usable code for storing the unique record in a repository associated with the Bloom filter.

13. The computer usable program product of claim 12, wherein computer usable code for storing the unique record in the repository comprises computer usable code for setting an indicator in the corresponding value in the corresponding section of the Bloom filter for each value distributed to the corresponding queues for the unique record.

14. The computer usable program product of claim 9, further comprising:

computer usable code for identifying any records in a preliminary plurality of records that are redundant relative to other records in the preliminary plurality of records;

computer usable code for removing any identified redundant records in the preliminary plurality of records from the preliminary plurality of records to create the plurality of records.

15. The computer usable program product of claim 14, wherein computer usable code for identifying any records in the preliminary plurality of records that are redundant relative to other records of the preliminary plurality of records comprises:

computer usable code for assigning a unique identifier to a record in the preliminary plurality of records;

computer usable code for computing a hash value for the record in the preliminary plurality of records based on the corresponding unique identifier;

computer usable code for storing the hash value to a corresponding hash table in a plurality of hash tables; and computer usable code for merging the plurality of hash tables to identify at least one record of multiple records that correspond to values that are identical for the at least one record in different hash tables as redundant relative to other records in the preliminary plurality of records.

16. The computer usable program product of claim 14, further comprising:

computer usable code for computing a value for a record in an initial plurality of records based on a plurality of fields associated with the record in the initial plurality of records;

computer usable code for distributing the record in the initial plurality of records to a corresponding buffer in a plurality of buffers based on the value for the record in the initial plurality of records, wherein each of the plurality of buffers is associated with a corresponding Bloom filter;

computer usable code for assigning records of a buffer in the plurality of buffers as the preliminary plurality of records;

computer usable code for pre-fetching a second Bloom filter corresponding to the buffer to cache; and computer usable code for assigning the second Bloom filter corresponding to the buffer as the Bloom filter.

17. The computer usable program product of claim 9, wherein the computer usable code is stored in a computer readable storage medium in a data processing system, and wherein the computer usable code is transferred over a network from a remote data processing system.

18. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

19. A data processing system for parallel data redundancy removal, the data processing system comprising:

a storage device including a storage medium, wherein the storage device stores computer usable program code; and a processor, wherein the processor executes the computer usable program code, and wherein the computer usable program code comprises:

computer usable code for computing a plurality of values for a record in a plurality of records;

computer usable code for distributing the plurality of values for the record to corresponding queues in a plurality of queues, wherein each of the plurality of queues is associated with a corresponding section of a Bloom filter;

computer usable code for determining whether each value distributed to the corresponding queues for the record is indicated by a corresponding value in the corresponding section of the Bloom filter; and computer usable code for identifying the record as a redundant record in response to a determination that each value distributed to the corresponding queues for the record is indicated by the corresponding value in the corresponding section of the Bloom filter.

20. The data processing system of claim 19, wherein the computing the plurality of values is performed in parallel by threads for multiple records in the plurality of records by threads, and the distributing the plurality of values is performed in parallel by the threads for the multiple records to corresponding queues in the plurality of queues by the threads.

* * * * *